(No Model.)  4 Sheets—Sheet 1.
A. LINDGREN.
DISK HARROW.
No. 576,407.   Patented Feb. 2, 1897.
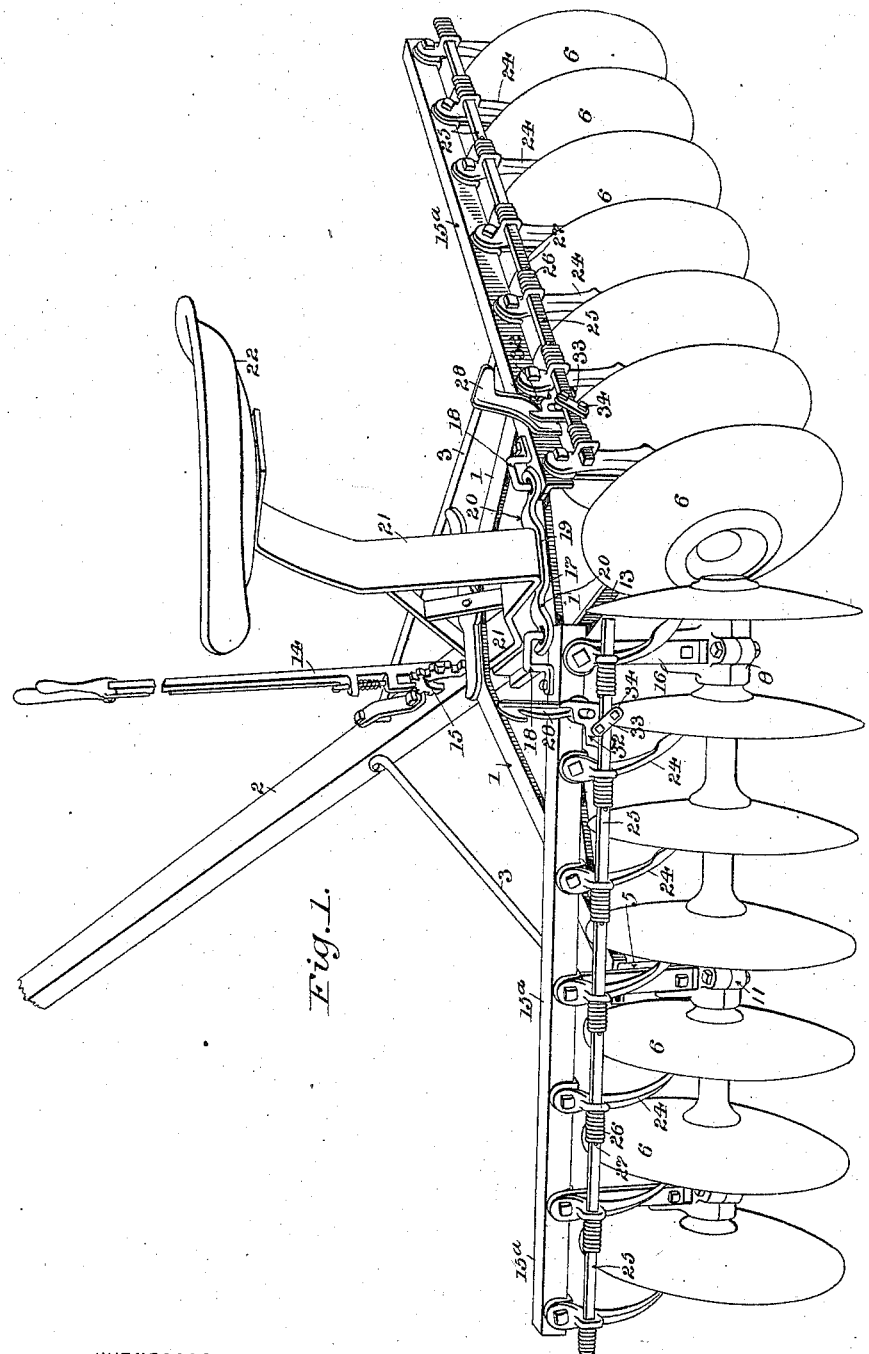
WITNESSES:
Arthur Ashley
F. D. Emon
INVENTOR
August Lindgren
BY
Philip T. Dodge
ATTORNEY.

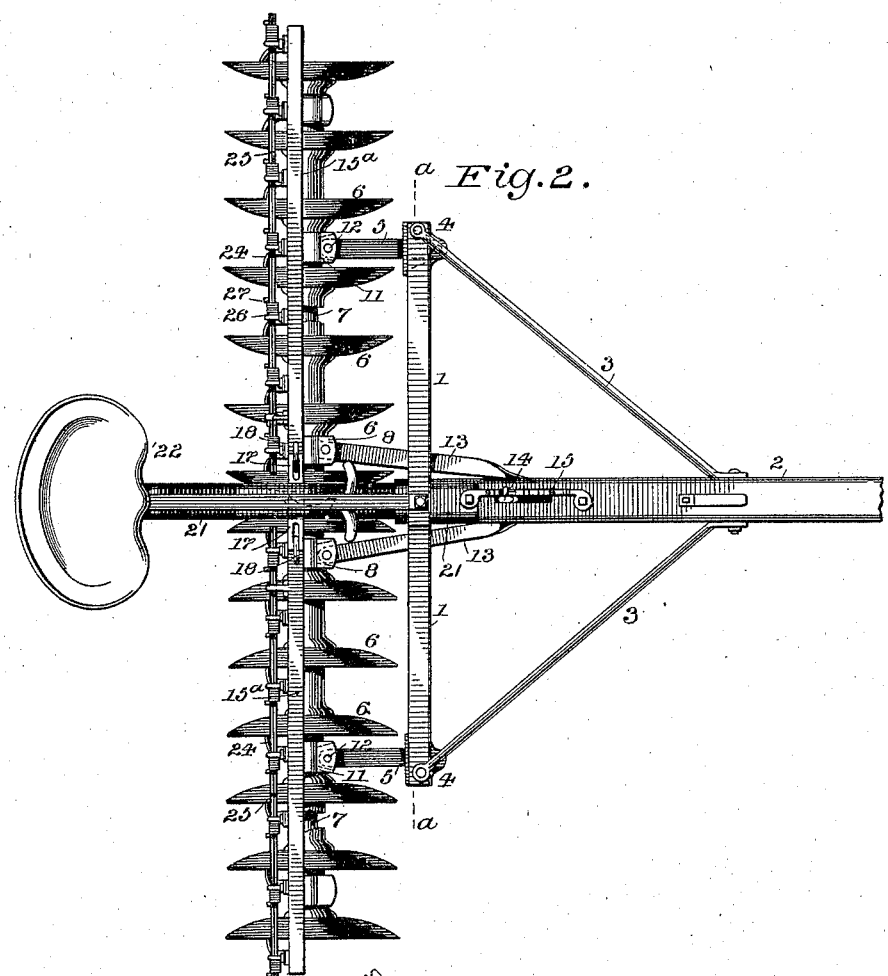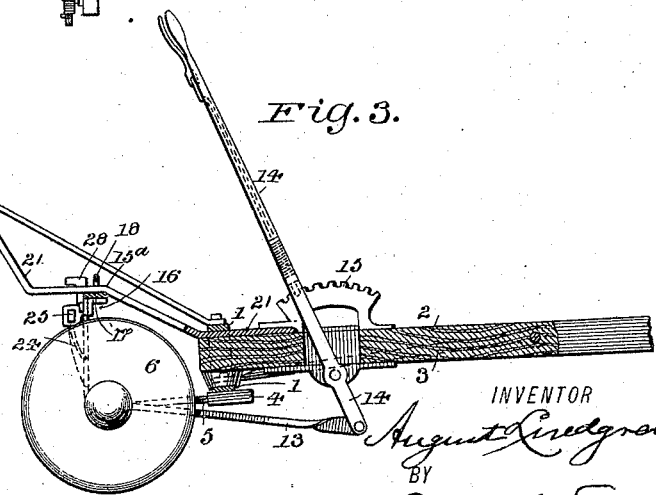

(No Model.)　　　　　　　　　　　　　　　4 Sheets—Sheet 3.
A. LINDGREN.
DISK HARROW.
No. 576,407.　　　　　　　　　Patented Feb. 2, 1897.
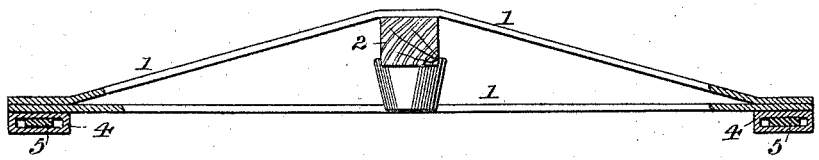
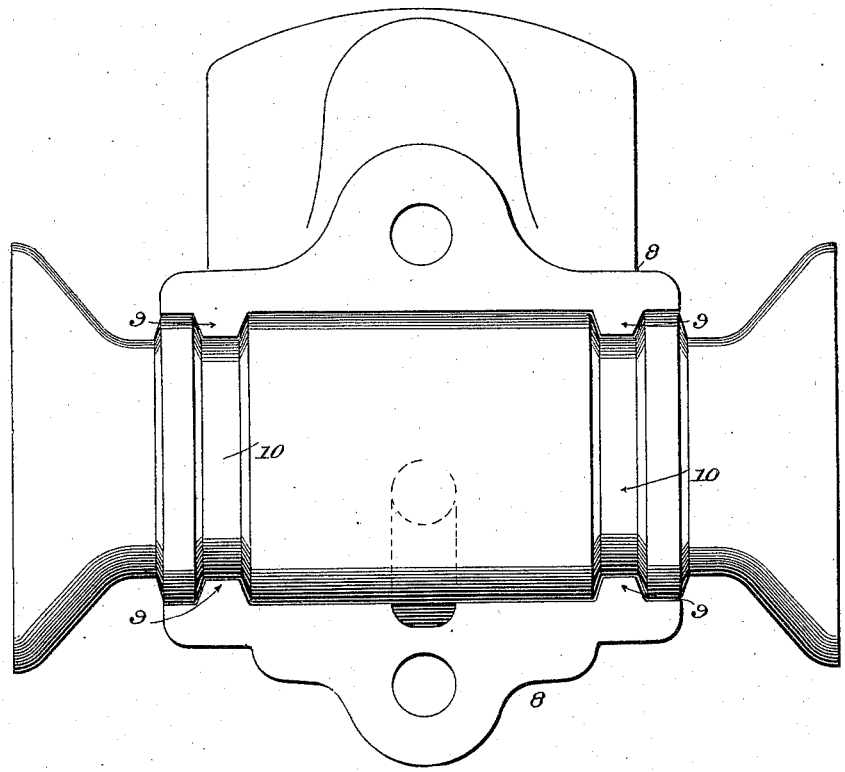
WITNESSES:　　　　　　　　　　　　INVENTOR

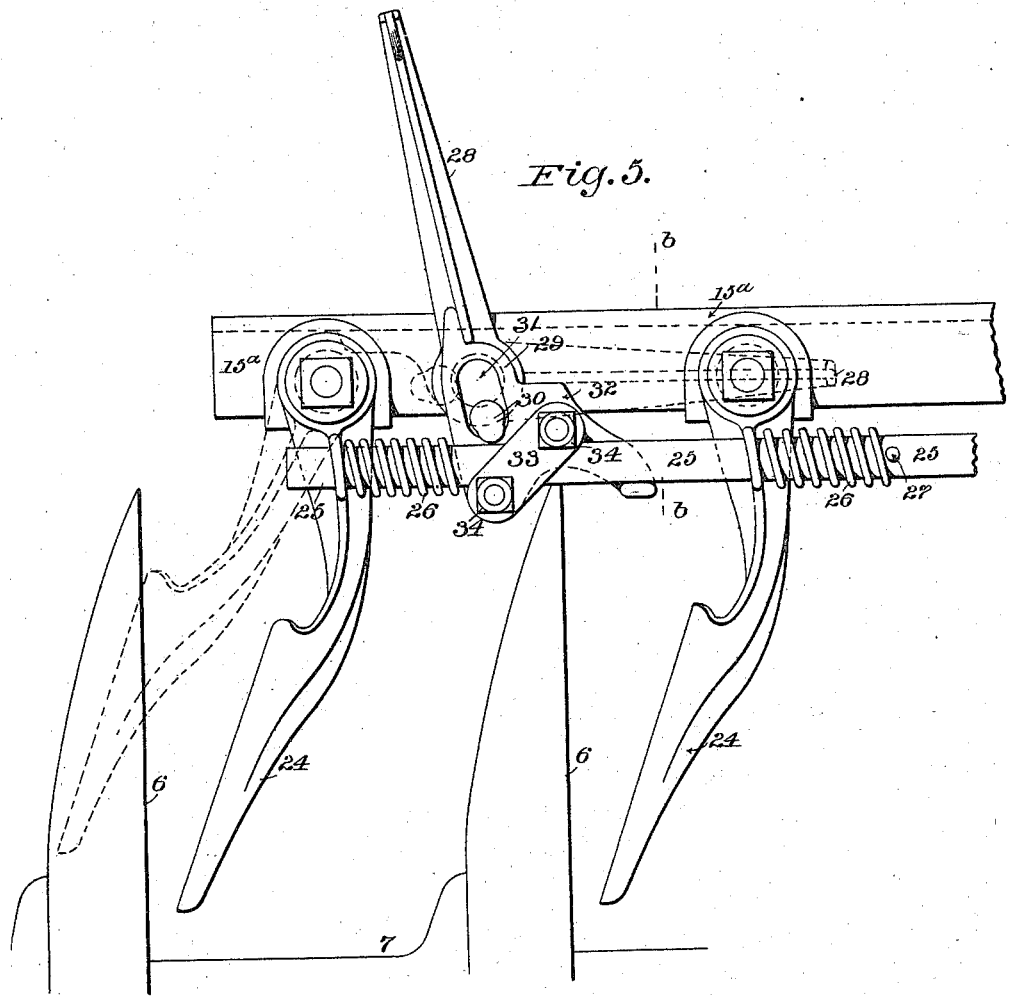

UNITED STATES PATENT OFFICE.

AUGUST LINDGREN, OF MOLINE, ILLINOIS, ASSIGNOR TO THE MOLINE PLOW COMPANY, OF ILLINOIS.

DISK HARROW.

SPECIFICATION forming part of Letters Patent No. 576,407, dated February 2, 1897.

Application filed March 21, 1896. Serial No. 584,289. (No model.)

*To all whom it may concern:*

Be it known that I, AUGUST LINDGREN, of Moline, county of Rock Island, and State of Illinois, have invented a new and useful Improvement in Disk Harrows, of which the following is a specification.

This invention has reference to disk harrows; and it consists of various improvements relating more particularly to the manner of connecting the inner ends of the gangs to receive the weight of the driver to cause the gangs to closely follow unevenness in the ground, to the arrangement and means for effecting the adjustment of the spring-scrapers, and to other details, which will be fully described in the specification and pointed out in the claims.

In the accompanying drawings, Figure 1 is a perspective view of my improved machine. Fig. 2 is a top plan view of the same. Fig. 3 is a vertical sectional longitudinal section. Fig. 4 is a transverse vertical section on the line $a\,a$ of Fig. 2. Fig. 5 is a rear elevation, on an enlarged scale, of the spring-scrapers and their actuating mechanism. Fig. 6 is a transverse vertical section on the line $b\,b$ of Fig. 5. Fig. 7 is a horizontal section through one of the bearings for the gang-shafts.

In the drawings, 1 represents a transverse truss-frame which is fixed to the rear end of a tongue 2 and held rigidly by means of two braces 3, fixed at their rear ends to the ends of the truss-frame and at their forward ends to the sides of the tongue, as plainly shown in Fig. 2. At its ends the truss-frame has fixed to its under side two boxes 4, each containing a horizontal slot, in which are pivoted the forward ends of two horizontal parallel bars 5, whose rear ends are pivotally connected to the outer end portions of two disk gangs 6, as will be more fully described hereinafter.

The disk gangs each consist of a series of cultivator-disks seated side by side on a horizontal shaft 7, which shafts extend end to end parallel with the truss-frame and in rear of the same, means being provided, as will be more fully described hereinafter, for adjusting the two gangs at different angular relations to vary the degree of stirring action which they will have on the soil.

The two shafts are encircled at their inner ends by two bearings 8, each of which consists of two plates curved at their inner sides to conform to the outer surface of the shaft and secured together by bolts or otherwise in the usual manner. To prevent the entrance of dust to the inner surface of the bearings, I propose to provide them at their opposite ends on their inner sides with ribs 9, as shown in Fig. 7, which ribs enter correspondingly-formed grooves 10 in the shaft. This arrangement will prevent the entrance of dust and will effectually retain the lubricant and keep the bearing in good order. The outer ends of the gangs are provided with similarly-formed bearings 11, to which the rear ends of the parallel bars 5 are pivoted, as at 12, as heretofore alluded to, the arrangement being such that the gangs can turn on these pivots as fulcrums when their inner ends are moved forward or backward to vary their inclinations.

The inner bearings are pivoted to the rear ends of two links 13, whose forward ends are fastened to the lower end of a lever 14, pivoted to a toothed segment-plate 15, fixed to the tongue, as shown in Fig. 3. The lever is provided with the usual locking-dog, adapted to engage the teeth on the plate and serving to hold the lever in the position to which it may be adjusted. By means of this lever, through the medium of the connecting-links, the inner ends of the gangs may be moved back and forth and held firmly in the position adjusted, to the end that the inclination of the gangs may be changed to vary the degree of stirring action which they will have on the soil.

In order that the inner ends of the gangs may be caused to follow closely any unevenness in the surface of the ground, I propose to so arrange the frame and driver's seat in relation to the gangs that the weight of the former will be borne by the inner ends of the gangs. This I accomplish by providing each gang with the usual horizontal beam $15^a$, extending over the disks parallel to their shafts and fixed to the upper ends of standards 16, having their lower ends secured firmly to the bearings. These beams are connected at their inner ends by means of a strap 17, as plainly shown in Fig. 1, which strap is seated on the upper side of the beams and is held in place loosely by means of staples or fastening-loops 18, the inner legs of which pass loosely through openings in the ends of the straps. This manner of fastening the strap constitutes a flexible or loose connection between the gangs and permits their ends to move vertically to a limited extent independently, in order to conform to the unevenness in the ground. At its center the strap is bent to form a flat bearing-surface 19, bounded by two shoulders 20, and on this flat portion the seat spring or standard 21 loosely rests about midway of its length, the forward end of the standard being fixed to the rear end of the tongue, whence it extends rearward and upward to the strap, thence horizontally over the same, and finally upwardly, where a seat 22 is fixed to it. It will be observed that under this arrangement the weight of the driver and the frame of the machine are borne by the strap, which constitutes a flexible connection between the inner ends of the gangs, the seat-standard, which is connected rigidly to the tongue and frame, resting loosely on the strap. As a result the inner ends of the gangs are capable of a limited movement vertically independently and are held closely to their work irrespective of any unevenness which may exist in the surface of the ground.

In order to clean the concave face of the disks and remove the soil which may lodge therein, I provide a series of scraper-fingers 24, as shown more particularly in Fig. 5, each pivoted at its upper end on a horizontal axis on the rear side of the two gang-beams, whence they extend downward and terminate somewhat inward of the edge of the disks. Each of the fingers is formed on its rear edge with an opening through which a horizontal movable actuating-bar 25 extends. This bar, adjacent to each of the fingers, is encircled by a spiral spring 26, one end of which bears against a pin 27, fixed to the bar, while its other end bears against the finger. The springs exert an independent pressure on the fingers, and by the movement of the bar endwise they will be compressed simultaneously and will move all the fingers at once against the concave sides of the disk, the fingers while in this position being capable of an independent yielding movement.

In order that the actuating-bar may be moved endwise conveniently and in order that it may automatically lock to hold the fingers against the face of the disks, I provide a vertical operating-lever 28, which is pivoted to the rear side of the gang-beam, as at 29, and is provided on its end beyond its pivot with a laterally-projecting lug 30, engaging in an upright slot 31, formed in a vertical plate 32, extending at the front of the actuating-bar and clamped securely thereto by means of a strap 33 and fastening-bolts 34. When the lever is in a vertical position, as shown in full lines in Fig. 5, the lug will extend in the lower end of the slot, and the plate and rod will be held in the position shown, with the scrapers out of action. When the scrapers are to be moved into action in contact with the face of the disk, the lever is turned down to the horizontal position shown in dotted lines, which action will move the plate and rod to one side, the lug moving to the upper end of the slot and to a position in line with the axis of the lever, the result being that any pressure on the lug will have no effect to move the lever from this horizontal position. In this way the lever and lug act as a lock, and the lever when turned to a horizontal position will be maintained in this position and will hold the fingers against the face of the disks.

Having thus described my invention, I claim—

1. In a disk harrow the combination with the draft-frame of the two disk gangs jointed thereto to move in a horizontal plane, a strap seated on the inner ends of the gangs and loosely connecting the same, whereby they are movable to a limited extent vertically at their inner ends, and a seat-standard fixed to the draft-frame extending rearwardly therefrom and resting loosely on the connecting-strap; whereby the inner ends of the gangs may be moved horizontally back and forth with relation to the seat-standard, and whereby the weight of the driver will tend to depress the inner ends of the gangs.

2. In a disk harrow, the combination with the frame of the two disk gangs jointed thereto, a strap loosely connected with the inner ends of said gangs and formed with two upwardly-extending shoulders and an intermediate flat bearing-surface, and a seat-standard rigidly secured to the frame and resting loosely on the bearing-surface of the strap.

In testimony whereof I hereunto set my hand, this 17th day of February, 1896, in the presence of two attesting witnesses.

AUGUST LINDGREN.

Witnesses:
A. W. WAY,
F. G. ALLEN.